United States Patent [19]

Gauthier et al.

[11] 4,363,955
[45] Dec. 14, 1982

[54] POST-BAKING OR HEATING TUNNEL-TYPE OVEN, IN PARTICULAR FOR FOOD PRODUCTS

[76] Inventors: Robert H. Gauthier; Raymonde J. B. Frechou epouse Gauthier, both of 32, Ave. du General Michel Bizot, 75012 Paris, France

[21] Appl. No.: 227,077
[22] PCT Filed: Apr. 18, 1980
[86] PCT No.: PCT/FR80/00063
 § 371 Date: Dec. 20, 1980
 § 102(e) Date: Dec. 19, 1980
[87] PCT Pub. No.: WO80/02224
 PCT Pub. Date: Oct. 30, 1980

[30] Foreign Application Priority Data

Apr. 20, 1979 [FR] France ............................. 79 10071

[51] Int. Cl.³ .................................................. F27B 9/06
[52] U.S. Cl. ....................................... 219/388; 99/386; 99/443 C; 219/354; 219/411; 432/49
[58] Field of Search ............... 219/350, 352, 354, 388, 219/411, 521; 99/339, 386, 389, 443 R, 443 C; 432/49, 239

[56] References Cited

U.S. PATENT DOCUMENTS

| 1,656,709 | 1/1928 | Kelly | 219/388 |
| 1,858,764 | 5/1932 | Cooley | 219/388 |
| 2,454,370 | 11/1948 | Beaubien | 219/388 |
| 2,504,110 | 4/1950 | Davis et al. | 219/388 |
| 2,549,619 | 4/1951 | Miskella | 219/388 X |
| 2,575,426 | 11/1951 | Parnell | 219/388 X |
| 2,629,162 | 2/1953 | Peck | 219/388 X |
| 2,820,131 | 1/1958 | Kodama | 219/388 |
| 3,249,741 | 5/1966 | Mills | 219/38 8 |
| 3,448,678 | 6/1969 | Burstein | 99/386 |
| 3,515,854 | 6/1970 | Williams | 219/388 |
| 3,601,582 | 8/1971 | Boisfleury | 219/388 |
| 4,244,285 | 1/1981 | Balier | 99/339 |

FOREIGN PATENT DOCUMENTS 2230293 12/1974 France.
693878 7/1953 United Kingdom.

Primary Examiner—Volodymyr Y. Mayewsky
Attorney, Agent, or Firm—Steinberg & Raskin

[57] ABSTRACT

The invention relates to an oven for heating or post-baking various products, in particular bakery bread.

The oven comprises a chamber open at both its ends, through which passes a conveyor constituted by a metal netting or lattice through which are passed transverse bars connected at their ends to driving chains. Series of infrared emitting tubes are arranged above and below the conveyor.

The invention relates in particular to ovens for post-baking bakery products.

8 Claims, 3 Drawing Figures

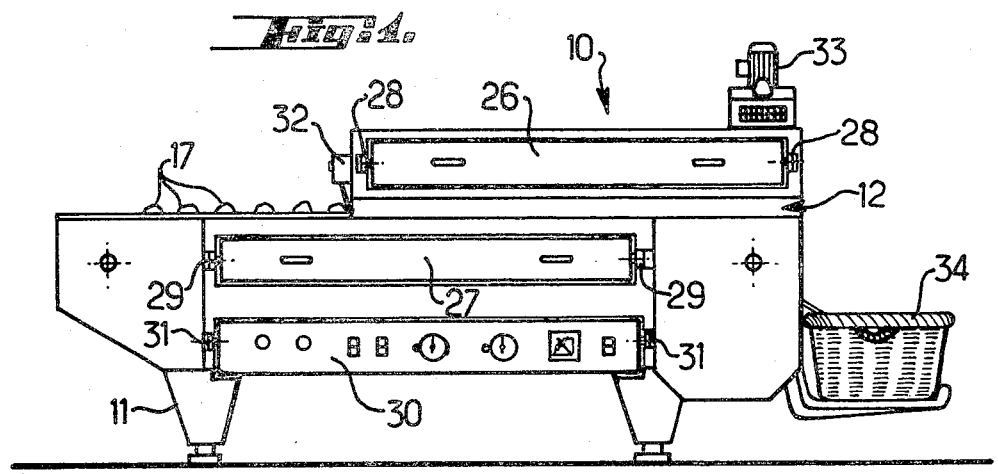
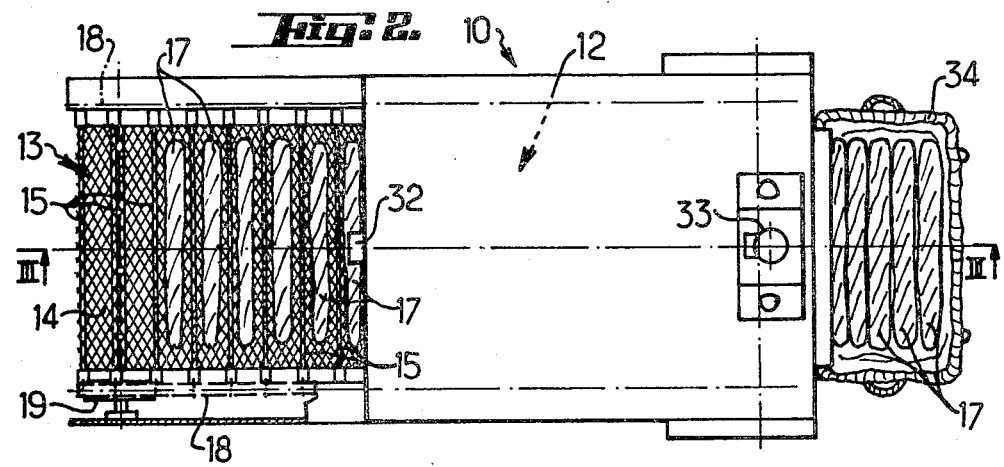
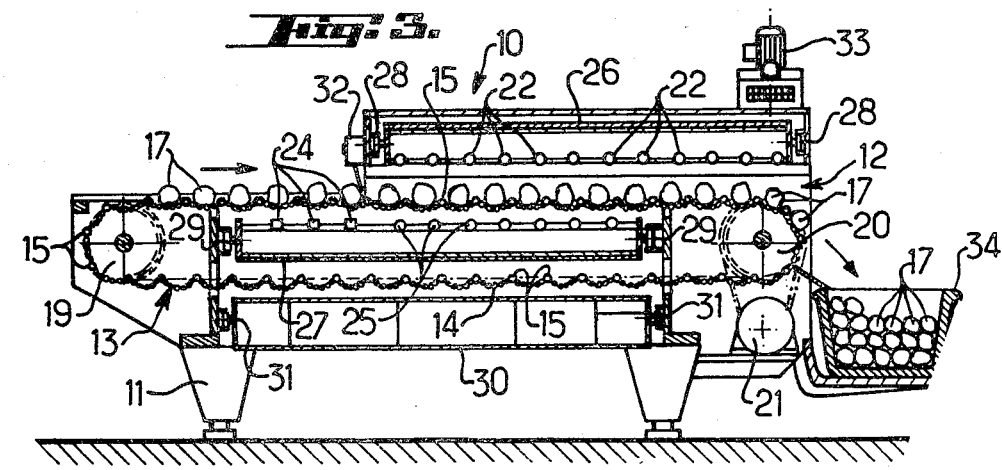

POST-BAKING OR HEATING TUNNEL-TYPE OVEN, IN PARTICULAR FOR FOOD PRODUCTS

TECHNICAL FIELD

The invention relates generally to and has essentially for its object a tunnel-type oven for post-baking or heating various products, in particular food products, and which is more especially intended for final baking and browning bakery bread.

PRIOR ART

There are already known in the prior art a rather great number of tunnel-type ovens for post-baking and browning bread loaves. The bread loaves or other bakery products are therefore pre-baked by the bread maker and are thereafter delivered in that condition to the retailers, who may keep them a few hours before subjecting them to final baking and browning before selling them to customers.

Such ovens generally include a chamber open at both its ends, a conveyor most often of the roller-type passing through the chamber and intended to support the bread loaves, and heating means most often of the infra-red radiation type placed within the chamber above the conveyor and the products the baking of which is to be completed or which require warming up.

However, although operating almost satisfactorily, such ovens suffer from drawbacks. They often are large-sized, their mechanical structure is heavy, the use of a roller conveyor does not allow accurate positioning of the products to be baked or warmed up, and so forth.

STATEMENT OF THE INVENTION

The purpose of the invention is to obviate the drawbacks of the known ovens of the above type, and provides to this end an oven for post-baking or heating various products, in particular for browning bread, comprising a chamber open at both its ends and traversed by a conveyor carrying the products, and heating means, in particular infrared heating means, provided in the chamber. According to one feature of the invention the conveyor is of the type with wide meshes or multiple openings allowing the passage, in particular, of radiations, and in that said heating means are provided above and below the conveyor portion carrying the said products.

This feature of the invention allows the products to be heated simultaneously from above and from below, whereas in the case of a roller conveyor it is impossible to heat the products from below.

According to another feature of the invention, the heating means comprise a first series of infrared radiation emitting tubes arranged above the conveyor, and a second series of infrared radiation emitting tubes placed under the conveyor portion carrying the products, each of the said two series of tubes being associated with independent power-regulating means.

It is thus possible to regulate at will the heating power of the upper tubes and that the lower tubes, so that the operation of the oven can be adapted for various products, or to products of a same type slightly differing from one another.

BRIEF DESCRIPTION OF THE DRAWINGS

The invention will be better understood and other purposes, characterizing features, details and advantages thereof will appear more clearly as the following explanatory description proceeds with reference to the appended diagrammatic drawings given solely by way of example illustrating one form of embodiment of the invention and wherein:

FIG. 1 is a diagrammatic side-view of an oven according to the invention;

FIG. 2 is a top view of the oven shown in FIG. 1; and

FIG. 3 is a diagrammatic sectional view upon the line III—III of FIG. 2.

DESCRIPTION OF THE PREFERRED EMBODIMENTS

In the drawings is illustrated one preferred form of embodiment of a tunnel-type oven according to the invention, intended more particularly for post-baking and browning bakery bread.

In a conventional manner, the oven 10 comprises a frame or body 11 the upper and lower portions of which define between themselves a chamber 12 open at both its longitudinal ends, and which is traversed by a conveyor 13.

According to the invention, the conveyor 13 is of the endless belt of band type constituted by a metal mesh structure, lattice or netting 14 with wide articulated meshes, supported by transverse bars or rods 15 simply passed through appropriate meshes of the netting 14 and spaced from one another a distance slightly greater than the diameter of a bread loaf. The bars 15 are so mounted on the netting 14 that the flexible netting forms between two consecutive bars 15 a small basket-like portion intended to receive a loaf 17.

The ends of the bars 15 are connected to driving chains 18 each passing, at one end of the tunnel-type oven, round a freely mounted toothed wheel 19, and at the other end of the oven, round a driving wheel 20 rotated from a motor-reducer set 21. Between the wheels 19 and 20, the chains 18 are supported and guided by longitudinal rails (not shown) secured to the frame 11.

Heating means, advantageously constituted by infrared radiation emitting tubes, are provided within the chamber 12 for final baking and rapid browning of the loaves 17. According to the invention, the said heating means comprise a first series of emitting tubes 22, arranged transversely above the upper portion of the band 13 carrying the loaves 17, as shown in FIG. 3, and a second series of emitting tubes 24 and 25, which are arranged transversely under the upper portion of the band 13 carrying the loaves 17.

It should be observed that the first series of tubes 22 is shifted longitudinally towards the right (in the drawings) with respect to the second series of tubes 24 and 25.

The first series of tubes 22 comprises only short-wave infrared radiation emitting tubes, whereas the second series of tubes comprises two or three medium-wave infrared radiation emitting tubes 24 followed by short-wave infrared radiation emitting tubes 25. The tubes 24 are those located ahead of the chamber 12, nearer to the oven end where the loaves are loaded onto the band 13.

Advantageously, the two series of infrared radiation emitting tubes are each mounted in a drawer or like sliding receptacle 26, 27, respectively, the said drawers being movable transversely with respect to the longitudinal direction of the oven by means of lateral slide-guides 28, 29, respectively.

Likewise, all the oven feed and control circuits are mounted in a third drawer or like sliding receptacle 30 movable transversely of the oven along lateral slide-guides 31 supported by the frame 11. This arrangement greatly facilitates oven service and maintenance.

The oven according to the invention also comprises a counting device 32 located at the front of the chamber 12 and of the flexible-blade or reed switch type actuated by the loaves 17 entering the chamber 12.

The oven is also provided with an extracting, drawing or sucking fan 33 placed for example on the upper wall of the chamber 12, at the exit end thereof, and intended to suck and reject outside the oven part of the air contained in the chamber 12.

The oven operates as follows.

Depending on the products the baking of which is to be completed or which are to be heated, the speed of the belt 13 and the heating power of the first series of emitting tubes 22 and of the second series of emitting tubes 24, 25 are adjusted appropriately. It is thereafter sufficient to switch on the oven, emitting tubes coming into operation instantaneously.

One or several persons standing at the left-end of the oven (on the drawings) take the loaves 17 and place them in the small basket-like portions formed by the netting 14 between the consecutive bars 15. The loaves 17 are moved through the heating chamber 12 by the conveyor 13 at the pre-selected speed. Each loaf 17 entering the chamber 12 actuates the counting device 32. The loaves, which are only pre-baked when entering the chamber 12 are subjected therein to final baking and browning, and emerge from the chamber 12 ready to be sold immediately to the customers after being collected in a basket 34 provided to this end.

The medium-wave infrared radiation emitting tubes 24 placed ahead of the space 12 are much less dazzling than the short-wave infrared radiation emitting tubes 22 and 25 provided within the chamber 12 and cannot therefore inconvenience the workmen feeding the oven with loaves or the people standing around the oven.

During the operation of the oven, the fan 33 sucks part of the air contained in the chamber 12 and rejects it outside the oven. A pleasant smell of new bread thus spreads about the oven. It will be noted that the heating means are of the radiating type and not of the convection type, the air within and about the oven is practically not heated, and it is absolutely unnecessary to heat-insulate the oven. The fan 33, therefore, is not intended for air circulation within the chamber 12, but only for spreading about the oven a smell of new bread, which allows the sale of bread to be increased when the place where an oven according to the invention is located is one to which the public or the customers have access.

It will also be noted that since the loaves 17 carried by the band 13 are spaced from one another a distance approximately equal to the diameter of a loaf, the lateral portions of the loaves are heated by the infrared rays and do not remain white.

We claim:

1. An oven for post-baking or heating various product in particular, for browning bakery bread, comprising a chamber open at both its ends and traversed by a conveyor carrying the products, a loading zone situated at one of said chamber ends, and infrared heating means provided in the said chamber, the conveyor being of the type allowing the passage of radiations, and said infrared heating means comprising a first series of infrared radiation emitting tubes arranged above the conveyor and a second series of infrared radiation emitting tubes situated under the conveyor portion on which the products are carried, and wherein said first and second series of radiation emitting tubes are longitudinally shifted with respect to each other such that said second series of radiation emitting tubes comprises a set of radiation emitting tubes located upstream of the chamber in the direction in which the products are conveyed through the chamber and outside thereof in the zone of loading the products on the conveyor, and wherein the other ones of said radiation emitting tubes which are located inside said chamber being adapted to emit short-wave infrared radiation, whereas said set of radiation emitting tubes located upstream and outside of said chamber are adapted to emit longer wave infrared radiation, such as medium-wave infrared radiation, which is less dazzling to persons loading the product on said conveyor in said loading zone than short-wave infrared radiation.

2. An oven according to claim 1, characterized in that the conveyor is of the endless band or belt type constituted by a metal netting, lattice or like mesh structure with wide meshes, passing round return guiding wheels at both ends of the oven, and designed for pockets or baskets extending in perpendicular relationship to the direction of displacement of the conveyor and spaced from one another in the longitudinal direction of the conveyor, each said pocket or basket being adapted to receive an afore-mentioned product.

3. An oven according to claim 1, characterized in that the conveyor band is of the flexible type with articulated meshes and is supported at regular intervals by transverse bars or rods passed through some of the meshes and connected at their ends to driving chains, so as to form a basket-like receptacle for a said product between two consecutive bars or rods, the depth of the said pockets being about half the height of the said product.

4. An oven according to claim 1 wherein the two series of emitting tubes and the oven feed and control circuits are mounted in drawers movable transversely to the oven.

5. An oven according to claim 1 wherein an adjustable homogenizing and extracting or sucking fan is provided in proximity to the oven exit.

6. An oven according claim 1 wherein the conveyor is of the adjustable-speed type.

7. An oven according to claim 1 further comprising a device for counting the products passing through the oven.

8. An oven according to claim 1 wherein the said two series of tubes are each associated with independent power-regulating means.

* * * * *